US011097778B2

(12) United States Patent
Yoshimoto (10) Patent No.: US 11,097,778 B2
(45) Date of Patent: Aug. 24, 2021

(54) VEHICLE REAR STRUCTURE

(71) Applicant: Toyota Jidosha Kabushiki Kaisha, Toyota Aichi-ken (JP)

(72) Inventor: Masanori Yoshimoto, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 121 days.

(21) Appl. No.: 16/433,187

(22) Filed: Jun. 6, 2019

(65) Prior Publication Data

US 2019/0375457 A1 Dec. 12, 2019

(30) Foreign Application Priority Data

Jun. 11, 2018 (JP) .............................. JP2018-111174

(51) Int. Cl.
  *B62D 21/03* (2006.01)
  *B62D 25/08* (2006.01)
  *B62D 21/15* (2006.01)

(52) U.S. Cl.
  CPC ............. *B62D 21/03* (2013.01); *B62D 25/08* (2013.01); *B62D 21/152* (2013.01)

(58) Field of Classification Search
  CPC ......... B62D 21/02; B62D 21/03; B62D 21/07
  See application file for complete search history.

(56) References Cited

U.S. PATENT DOCUMENTS

| 4,128,260 A * | 12/1978 | Moore ..................... B60G 5/02 267/221 |
| 2002/0162224 A1* | 11/2002 | Gabbianelli .......... B62D 21/02 29/897.2 |
| 2009/0058145 A1* | 3/2009 | Park ....................... B62D 21/02 296/204 |
| 2012/0055722 A1 | 3/2012 | Matsuzawa et al. |
| 2018/0118268 A1* | 5/2018 | Buratto ................ B62D 21/155 |
| 2019/0016387 A1* | 1/2019 | Elbkaily ................ B62D 21/02 |
| 2019/0111973 A1* | 4/2019 | Onoda .................. B62D 21/02 |
| 2019/0152530 A1* | 5/2019 | Kato .................. B62D 25/2072 |
| 2019/0263450 A1* | 8/2019 | Inoue .................... B62D 21/18 |
| 2019/0275876 A1* | 9/2019 | Fukui ................ B62D 25/2027 |

FOREIGN PATENT DOCUMENTS

| CN | 203306113 U | 11/2013 |
| JP | 2011-005889 A | 1/2011 |
| JP | 2013-112210 A | 6/2013 |

* cited by examiner

*Primary Examiner* — Paul N Dickson
*Assistant Examiner* — Mary E Young
(74) *Attorney, Agent, or Firm* — Dinsmore & Shohl LLP (57) ABSTRACT

A vehicle rear structure includes a pair of laterally spaced apart rear side members extending along a longitudinal axis of a vehicle, and cross members extending between the pair of rear side members. Each of the rear side members includes a curve portion curved to be more inward at a rearer portion, and longitudinally-extending front and rear portions respectively disposed in front and at rear of the curve portion. A center cross member connects the front portions of the pair of rear side members. A first rear cross member connects boundary portions of the pair of rear side members. Each of the boundary portions is located between the curve portion and the rear portion of each of the rear side members. An intermediate cross member connects the curve portions of the pair of rear side members.

12 Claims, 7 Drawing Sheets

VEHICLE REAR STRUCTURE

CROSS REFERENCE TO RELATED APPLICATION

This application claims priority to Japanese Patent Application No. 2018-111174 filed on Jun. 11, 2018, which is incorporated herein by reference in its entirety including the specification, claims, drawings, and abstract.

TECHNICAL FIELD

The present disclosure relates to a vehicle rear structure that includes a pair of rear side members extending along a longitudinal axis of a vehicle, and multiple cross members that extend between the pair of rear side members.

BACKGROUND

Vehicles may include high voltage components, such as traction batteries, under rear seats. For such vehicles, various techniques have been proposed to achieve vehicle frames specifically aimed to ensure survival space for passengers and protect those high voltage components in the event of rear collisions.

For example, JP 2011-005889A discloses a frame structure to protect a wire harness connected to a traction battery from impact in the event of a rear collision. Generally, a vehicle includes, at the rear, a pair of rear side members extending along a longitudinal axis of the vehicle, and one or more cross members extending between the pair of rear side members. JP 2011-005889A provides a floor panel in which a wire harness through hole is formed. Deformation of the through hole is reduced by forming the through hole near to the rear side members and the cross members, both of which are relatively rigid. In this way, damage to the wire harness can be effectively prevented.

However, while JP 2011-005889A attempts to reduce deformation of the wire harness through hole, deformation of the rear side members themselves has not been sufficiently considered. In order to ensure survival space for passengers and protect high voltage components, it is desired that the deformation of the rear side members be reduced as much as possible in the event of a rear collision.

An object of the present disclosure is to provide a vehicle rear structure which can effectively reduce deformation of rear side members in the event of a rear collision.

SUMMARY

A vehicle rear structure according to one aspect of the present disclosure includes a pair of laterally spaced apart rear side members extending along a longitudinal axis of a vehicle, and a first cross member, a second cross member, and a third cross member, all cross members extending between the pair of rear side members. Each of the rear side members includes a curve portion curved to be more laterally inward at a rearer portion, and longitudinally-extending front and rear portions respectively disposed in front and at the rear of the curve portion. The first cross member connects the front portions of the pair of rear side members. The second cross member connects boundary portions of the pair of rear side members. Each boundary portion is located between the curve portion and the rear portion of each of the pair of rear side members. The third cross member connects the curve portions of the pair of rear side members.

By disposing the third cross member connecting the curve portions of the pair of rear side members, rear side members can be effectively prevented from being laterally inwardly bowed at the curve portions. In this way, the rear side members can be more effectively prevented from being deformed.

According to another aspect of the present disclosure, both ends of the third cross member may be bent obliquely upwards.

With the above structure, the third cross member is buckled and bent before the rear side member is laterally inwardly buckled and bent (inwardly bent). As a result, the rear side member is effectively prevented from being buckled.

According to yet another aspect of the present disclosure, the vehicle rear structure may further include a high voltage component disposed to straddle the first cross member and the third cross member.

The distance between the first cross member and the third cross member is not easily changeable because the rear side members are prevented from being deformed. By disposing the high voltage component to straddle the first cross member and the third cross member, a distance between the joints where the high voltage component is connected to the first and third cross members becomes not easily changeable, making compressive loads not easily applicable to the high voltage component. As a result, the high voltage component can be sufficiently protected.

According to yet another aspect of the present disclosure, a ratio between a distance between the first cross member and the third cross member and a distance between the third cross member and the second cross member may be 2:3 to 3:2.

The rear side members may be easily bowed and buckled around the longitudinal center between the first cross member and the second cross member. By providing the third cross member around the center (at a position of a ratio within 2:3 to 3:2), the rear side members can be effectively prevented from being deformed.

According to a vehicle rear structure of the present disclosure, because the third cross member connecting the curve portions of the pair of rear side members is provided, a laterally inward bend of each rear side member at each curve portion can be effectively prevented, and thus the rear side members can be effectively prevented from being deformed.

BRIEF DESCRIPTION OF DRAWINGS

Embodiment(s) of the present disclosure will be described with reference to the following figures, wherein.

DESCRIPTION OF EMBODIMENTS

Figure 1:
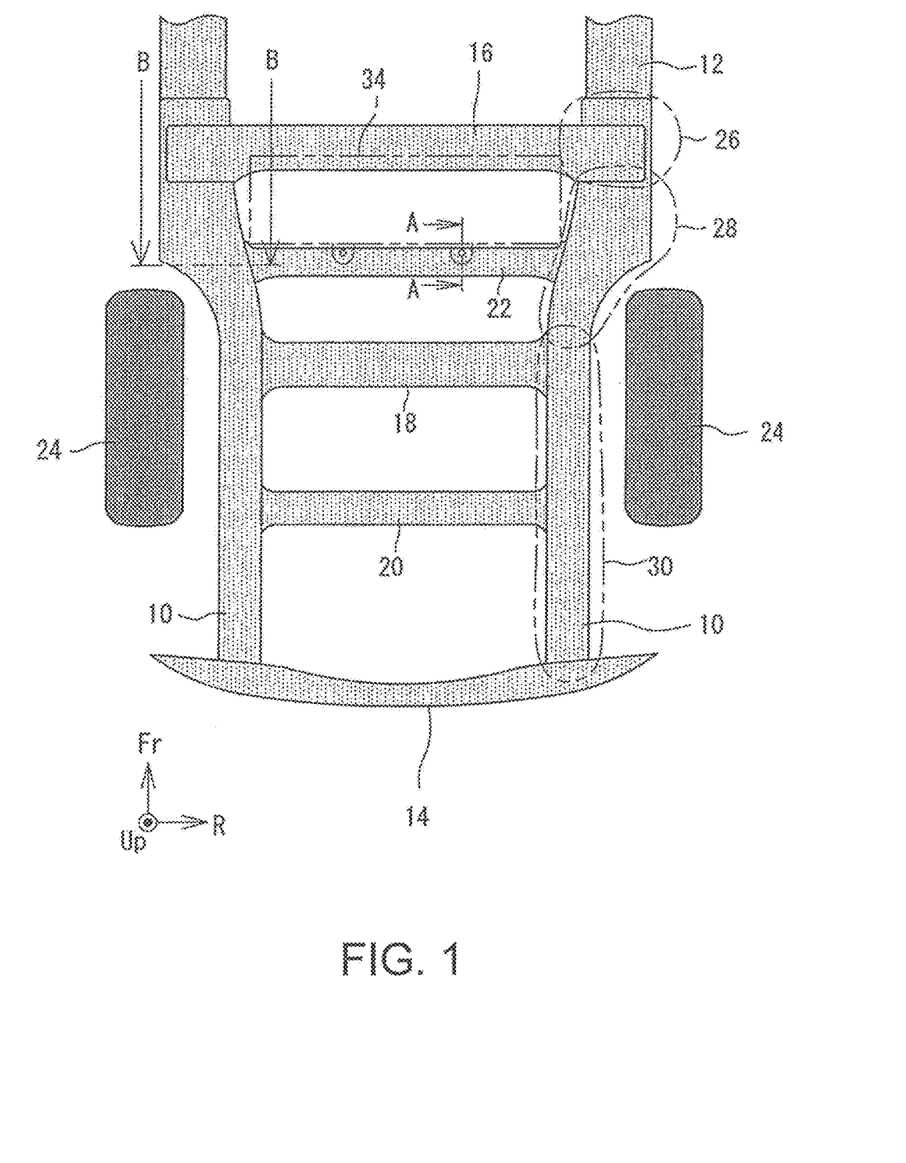
FIG. 1 is a schematic plan view of a vehicle rear frame.
Figure 2:
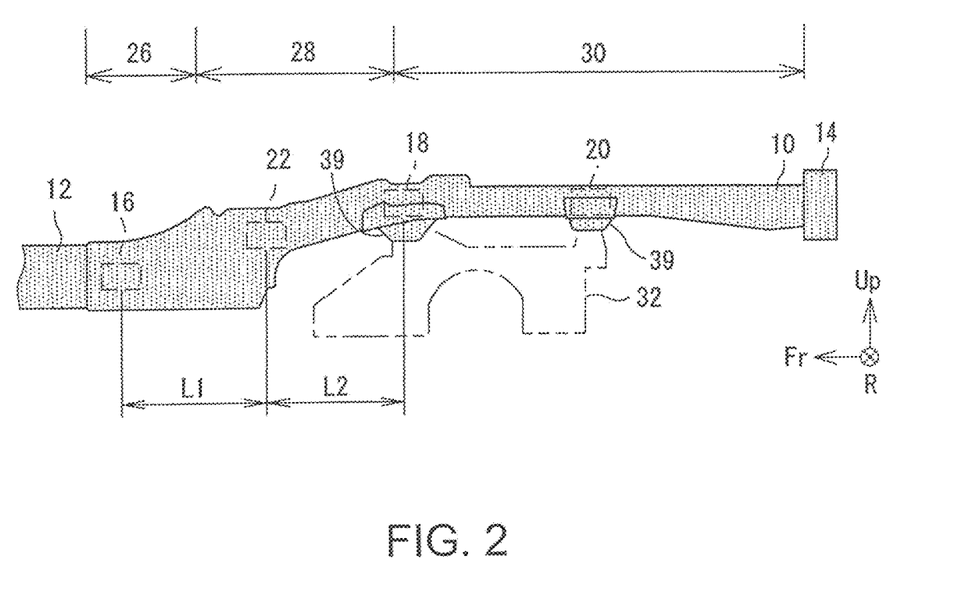
FIG. 2 is a schematic side view of the vehicle rear frame.
Figure 3:
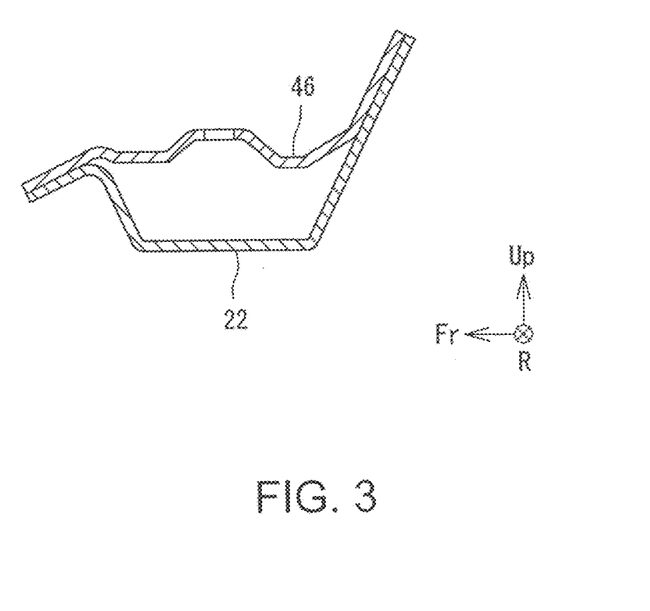
FIG. 3 is a schematic cross section taken along line A-A in FIG. 1.
Figure 4:
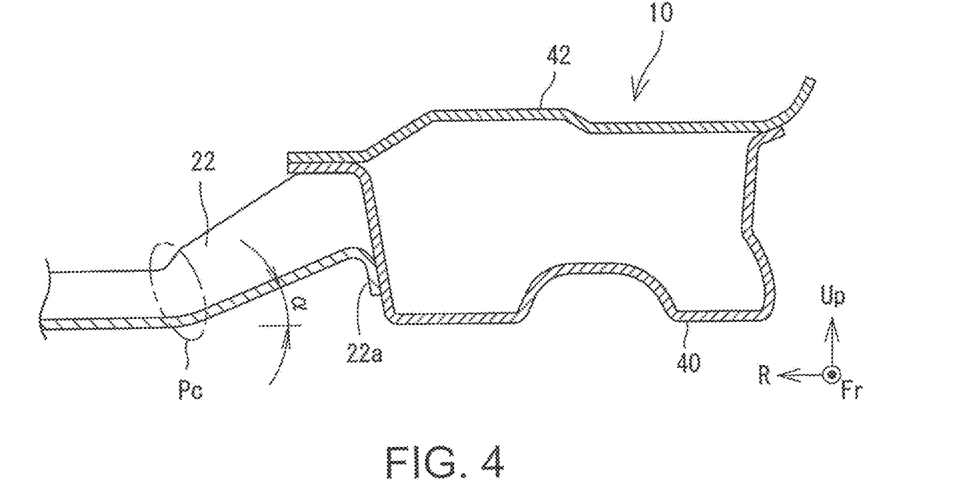
FIG. 4 is a schematic cross section taken along line B-B in FIG. 1.

A vehicle rear structure is described below with reference to the attached drawings. FIG. 1 is a schematic plan view of a vehicle rear frame. FIG. 2 is a schematic side view of the vehicle rear frame. FIG. 3 is a schematic cross section taken along line A-A in FIG. 1. FIG. 4 is a schematic cross section taken along line B-B in FIG. 1. In the drawings, Fr, Up, and R respectively indicate the front, upward, and right directions of the vehicle.

As shown in FIG. 1, a pair of rear side members 10 are disposed at the rear end of the vehicle. The rear side members 10 are frame members extending along a longitudinal axis of the vehicle. Front ends of the rear side members 10 are connected to floor side members 12, whereas rear ends of the rear side members 10 are connected to a rear bumper reinforcement 14.

As shown in FIG. 1, each of the rear side members 10 is inwardly curved at a certain point. This allows installation of rear wheels 24 on sides of the rear side members 10. In the description below, the laterally curved portion of each of the rear side members 10 is referred to as a "curve portion 28" and the front and rear portions sandwiching the curve portion 28 are respectively referred to as the "front portion 26" and the "rear portion 30". The rear portion 30 is located on the inner side with respect to the front portion 26 and/or has a lateral width shorter than that of the front portion 26. In this way, the central axis of the rear portion 30 is laterally inwardly displaced from that of the front portion 26. The lateral width of the curve portion 28 gradually decreases towards the rear end to absorb the lateral width difference between the front portion 26 and the rear portion 30. The curve portion 28 is curved to be more inward at a rearer portion.

As shown in FIG. 4, each of the rear side members 10 includes a side member first portion 40 and a side member second portion 42 welded together. The side member first portion 40 has a cross section of a substantial hat shape opened upwards, whereas the side member second portion 42 has a substantial planer board shape covering the opening of the side member first portion 40. As shown in FIG. 4, each of the rear side members 10 with the side member first and second portions 40, 42 welded together has a substantially rectangular cross section. In order to ensure rigidity of the rear side member 10 and control a bend point, the side member first and second portions 40, 42 include variously shaped concave or convex portions (beads) at some points. Each of the side member first portion 40 and the side member second portion 42 does not need to be formed from a single portion, but may be divided into multiple portions along the longitudinal axis of the vehicle. For example, the side member first portion 40 may be divided into three portions along the longitudinal axis of the vehicle.

Multiple cross members 16, 18, 20, and 22 extend between the pair of the rear side members 10. A center cross member 16 serving as a first cross member connects the front portions 26 of the pair of rear side members 10. A first rear cross member 18 serving as a second cross member connects the rear portions 30 of the pair of the rear side members 10. As obviously shown in FIG. 1, the first rear cross member 18 is connected around boundary portions between the curve portions 28 and the rear portions 30. A second rear cross member 20 connects the rear portions 30 of the pair of rear side members 10 at the rear of the first rear cross member 18. As shown in FIG. 2, brackets 39 are attached to each of the rear side members 10 near the joints where the rear side member 10 is connected to the first and second rear cross members 18, 20. A suspension member 32 is suspended below the first and second rear cross members 18, 20 via the brackets 39. A traction motor (not shown) generating a driving force for the vehicle is supported by the suspension member 32.

Another cross member, an intermediate cross member 22, is disposed between the center cross member 16 and the first rear cross member 18. The intermediate cross member 22 serving as a third cross member connects the curve portions 28 of the pair of rear side members 10. A main battery 34 for storing electric drive power is disposed to straddle the intermediate cross member 22 and the center cross member 16.

Specifically, as shown in FIG. 1, the main battery 34 has a substantially rectangular shape. A longitudinal axis of the main battery 34 is oriented along the lateral axis of the vehicle. A front edge portion of the main battery 34 is connected to the center cross member 16 via brackets or a floor panel (both not shown), whereas a rear edge portion of the main battery 34 is connected to the intermediate cross member 22 via brackets or other means.

As shown in FIG. 3, the intermediate cross member 22 has a substantially U-shaped cross section that is opened upwards. It should be noted that although a top plate 46 covering the top opening of the intermediate cross member 22 is shown in FIG. 3, the top plate 46 is provided only at the joints where the intermediate cross member 22 and other element (such as the main battery 34) are connected. Accordingly, the top plate 46 is not provided near both ends of the intermediate cross member 22, that is, the area shown in FIG. 4.

As shown in FIG. 4, the end portion of the intermediate cross member 22 on each side of the vehicle is bent obliquely upwards to be higher towards the laterally outer edge. In other words, the intermediate cross member 22 has a bend point Pc near the end on each side of the vehicle. A bend angle α at the bend point Pc (the angle between the bottom line of the intermediate cross member 22 and the horizontal line) is not limited to any particular angle as long as the bend angle α is larger than 0 and smaller than 90 degrees. However, a bend angle α of 10 degrees or larger can more effectively cause the intermediate cross member 22 to be bent, as described below.

Each edge of the intermediate cross member 22 on each side of the vehicle is bent to form a flange portion 22a that is substantially parallel to a side surface of the corresponding rear side member 10. The intermediate cross member 22 is welded to the side surface of the rear side member 10 via the flange portion 22a.

As described above, the intermediate cross member 22 connects the curve portions 28 of the pair of rear side members 10. By providing a cross member like the intermediate cross member 22, the rear side members 10 may be more efficiently prevented from being deformed in the event of a rear collision of the vehicle. This point is described below with a comparison with a conventional structure.

Figure 5:
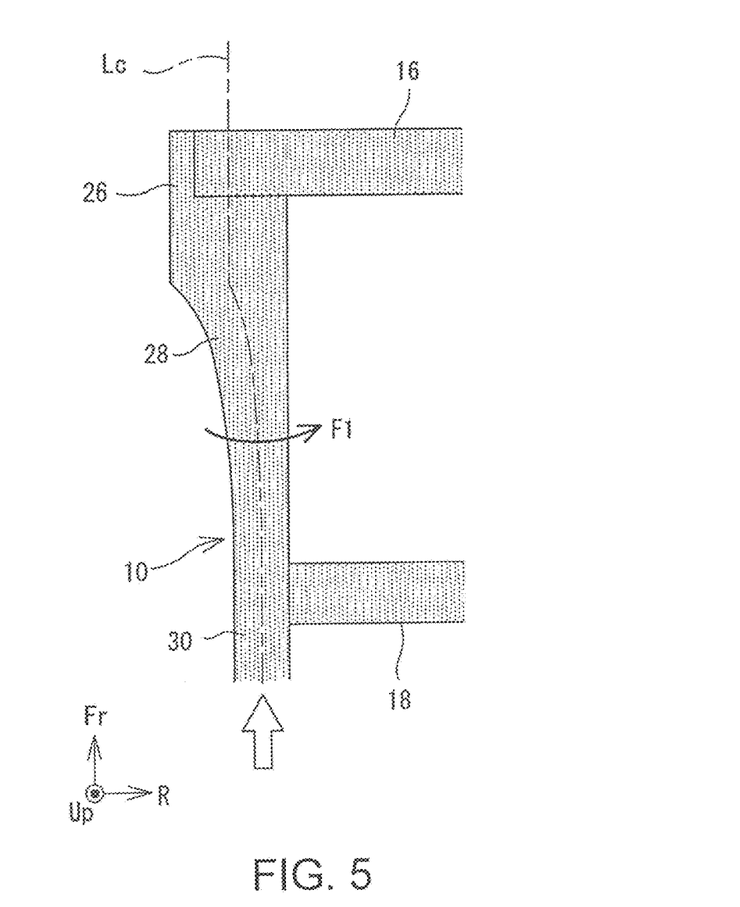
FIG. 5 is a schematic view of a vehicle rear structure without an intermediate cross member.

FIG. 5 is a schematic diagram of a vehicle rear structure without the intermediate cross member 22. When a collision occurs at the rear of the vehicle, collision loads are applied to the rear end of the rear side member 10. As described above, the rear side members 10 are required to be curved laterally inwards at certain points to allow installation of the rear wheels 24. In this way, the central axis Lc of each rear side member 10 is displaced laterally outwards starting at a certain point from the rear to the front of the vehicle. When collision loads are applied to the rear end of either one of the rear side members 10, while the collision loads are not laterally displaced from the central axis Lc in the rear portion 30 of the rear side member 10, the collision loads are laterally displaced from the central axis Lc in the curve portion 28 and the front portion 26. Accordingly, as shown in FIG. 5, without the intermediate cross member 22, a laterally inward force F1 is applied to the rear side member 10 in an area from the curve portion 28 to the front portion 26. This force F1 laterally-inwardly stresses the rear side member 10, causing "inward bow". In particular, because a center portion of the curve portion 28 of the rear side member 10 is away from both of the center cross member 16 and the first rear cross member 18, the inward bow can easily occur. When the amount of the inward bow increases, the collision loads become intolerable as an axial force, causing deformation of the rear side member 10 in an early stage of the collision. However, such deformation of the rear side member 10 must be prevented for as long as possible in order to ensure survival space for passengers and sufficiently protect the main battery 34.

In light of the above, the present embodiment provides the intermediate cross member 22 connecting the curve portions 28 of the pair of the rear side members 10. The intermediate cross member 22 connected to the curve portions 28 can effectively prevent the inward bow at the curve portions 28. The intermediate cross member 22 can effectively prevent the inward bow when the intermediate cross member 22 is located away from both of the center cross member 16 and the first rear cross member 18. In FIG. 2, a ratio between L1 and L2 may be but not limited to 2:3 to 3:2 (more specifically, around 1:1), where L1 represents the distance between the intermediate cross member 22 and the center cross member 16, and L2 represents the distance between the intermediate cross member 22 and the first rear cross member 18.

Figure 6:
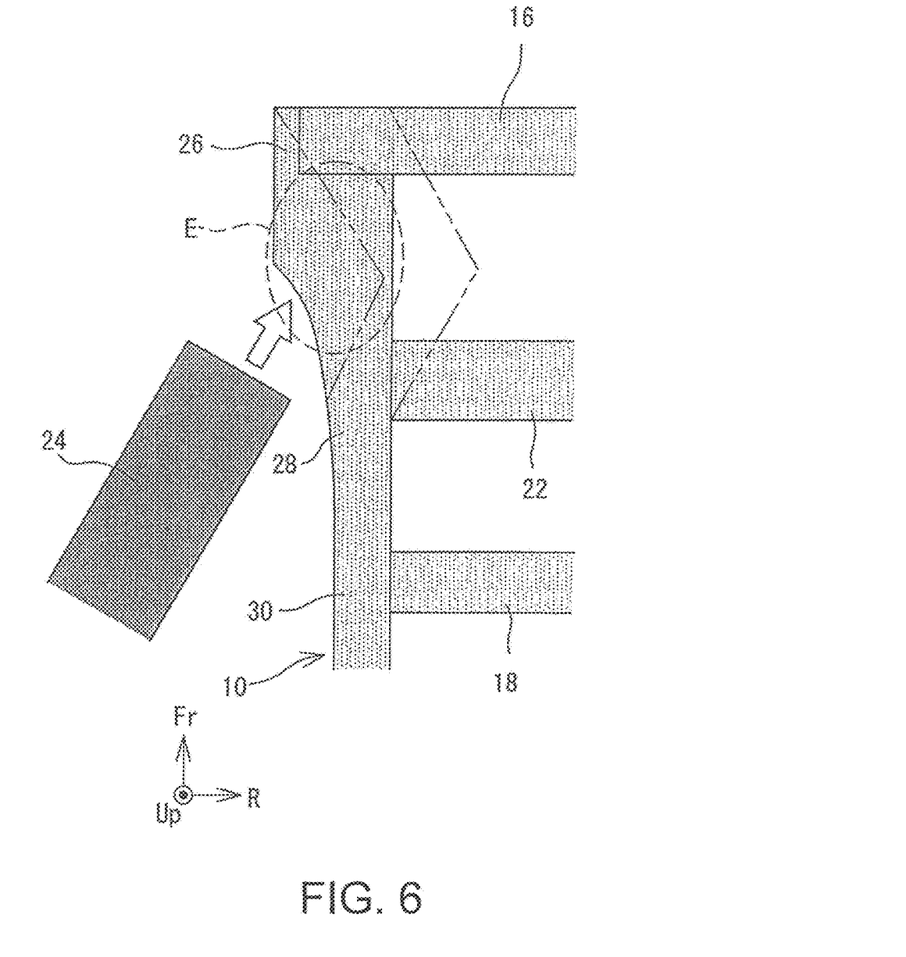
FIG. 6 is an image diagram showing how a rear side member is inwardly bent.
Figure 7:
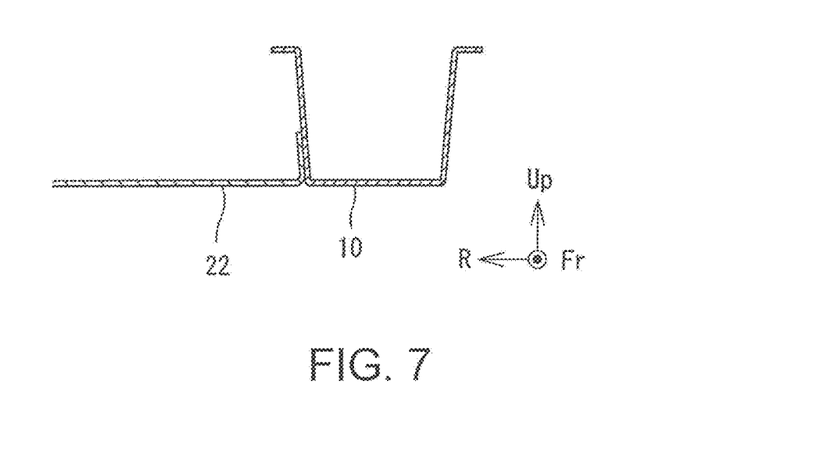
FIG. 7 is a diagram showing an intermediate cross member not bent at an end.

As described above, according to the present embodiment, the inward bow of the rear side members 10 can be effectively prevented by providing the intermediate cross member 22 connecting the curve portions 28. In order to distribute loads to the intermediate cross member 22 from the rear side member 10, the bottom line of intermediate cross member 22 and the bottom line of the rear side member 10 may be arranged continuously, as shown in FIG. 7. However, in such a case, because the inward bow of the rear side member 10 is firmly prevented, stress is likely to be concentrated in an area E (refer to FIG. 6) of the rear side member 10 between the center cross member 16 and the intermediate cross member 22. As a result, as shown with double-dashed lines in FIG. 6, the rear side member 10 may be inwardly buckled and bent (inward bend) in the area E. In particular, the inward bend in the area E is more likely to occur in a middle stage or later of a rear collision when the rear wheel 24 comes into contact with the curve portion 28 of the rear side member 10.

As described above, the front edge portion and the rear edge portion of the main battery 34 are respectively connected to the center cross member 16 and the intermediate cross member 22. When the distance L1 between the center cross member 16 and the intermediate cross member 22 is shortened, the distance between joints where the main battery 34 is connected to the center cross member 16 and the intermediate cross member 22 (hereinafter referred to as "joint distance of the main battery 34") is also shortened, applying a compressive load to the main battery 34. When the rear side member 10 is inwardly bent, the joint distance of the main battery 34 is shortened, disabling sufficient protection of the main battery 34.

In order to avoid such a stress concentration in the area E and prevent the inward bend of the rear side members 10, an inward bow of the rear side members 10 may be caused to avoid the stress concentration before the load applied to the rear side members 10 exceeds a yield point. In the present embodiment, as shown in FIG. 4 described above, the bend point Pc where the intermediate cross member 22 is bent obliquely upwards is provided near the end of the intermediate cross member 22 on each side of the vehicle. This is described below with reference to FIG. 8, which shows the intermediate cross member 22 that is bent at the bend point Pc.

Figure 8:
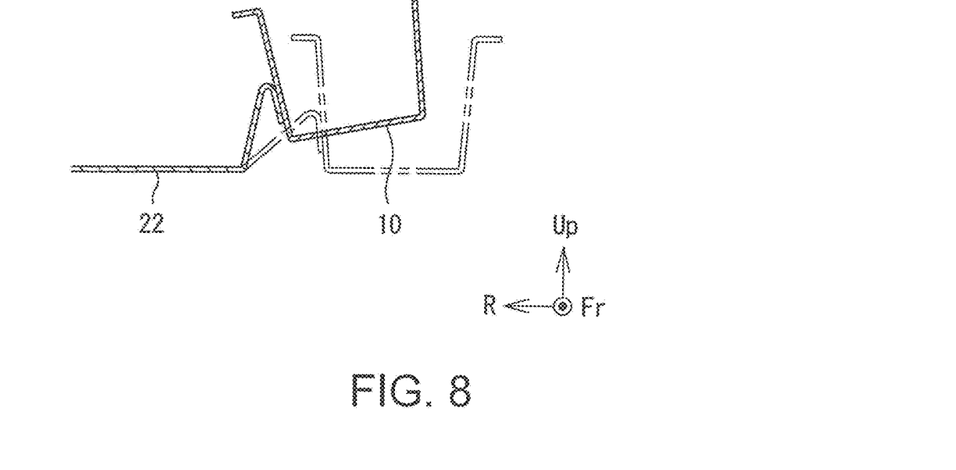
FIG. 8 is a diagram showing the intermediate cross member bent at a bend point.

As shown in FIG. 8, the intermediate cross member 22 is more easily bendable than the rear side members 10 with the bend point Pc provided near each end of the intermediate cross member 22. Thus, as shown in FIG. 8, the intermediate cross member 22 is bent at the bend point Pc prior to the inward bend of the rear side member 10 in a middle stage or later of the collision. When the intermediate cross member 22 is bent, because the rear side member 10 is allowed to be displaced laterally inward, the inward bow of the rear side member 10 occurs. In this way, the concentration of the stress can be reduced, effectively preventing the inward bend of the rear side member 10. As a result, the distance L1 between the center cross member 16 and the intermediate cross member 22, that is, the joint distance of the main battery 34, can be prevented from being shortened, enabling reliable protection of the main battery 34.

Figure 9A:
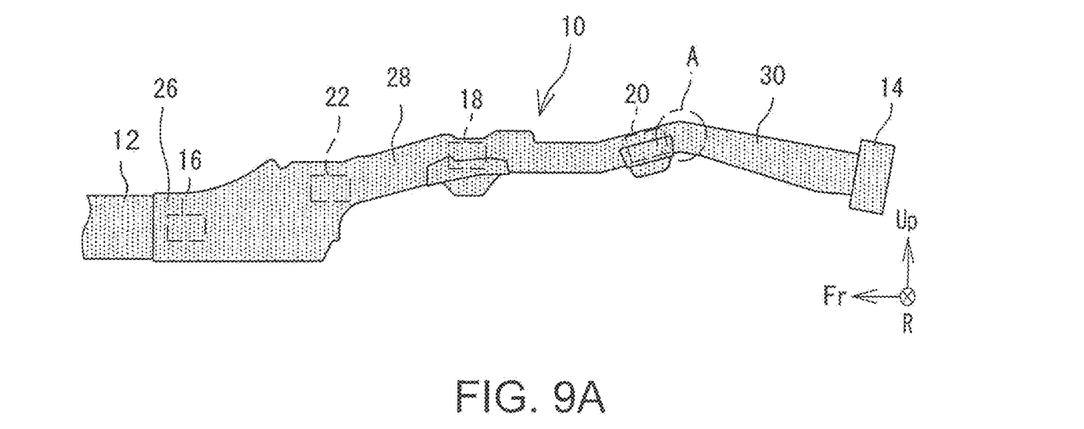
FIG. 9A is an image diagram showing how the rear side member deforms.
Figure 9B:
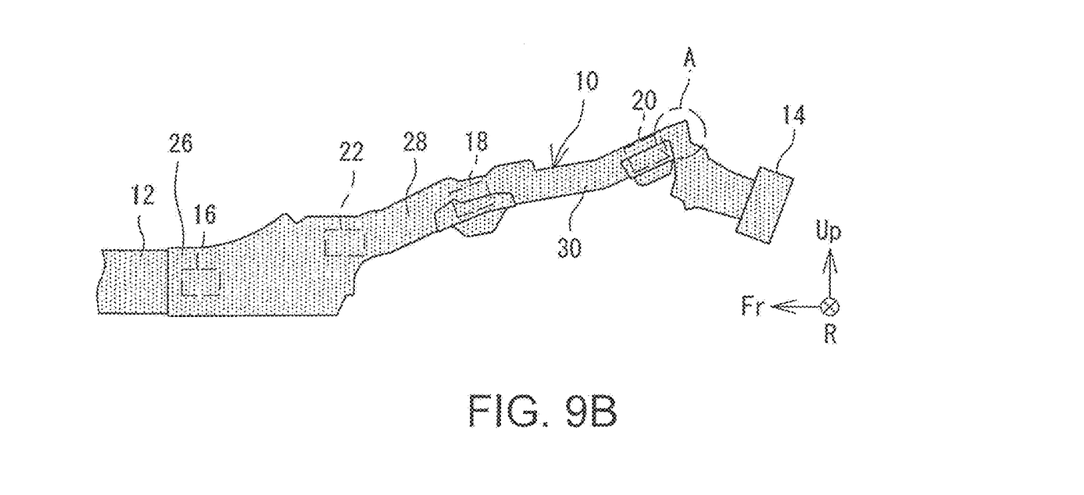
FIG. 9B is an image diagram showing how the rear side member deforms.
Figure 9C:
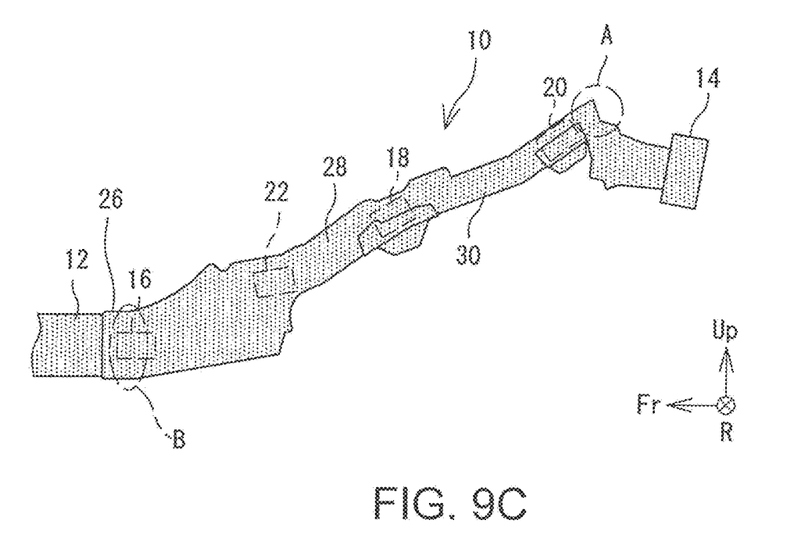
FIG. 9C is an image diagram showing how the rear side member deforms.

In a rear collision, the rear side members 10 may also be vertically deformed. Such deformation is described below with reference to FIGS. 9A to 9C. As shown in FIG. 9A, when a rear collision occurs, the rear side member 10 is bent so as to be raised around a joint with the second rear cross member 20 (hereinafter referred to as a "point A") to form a convex around the point A (hereinafter referred to as "convex bend"). As shown in FIG. 9B, as a result of collision loads applied after the convex bend, the rear side member 10 is further raised at the rear such that the rear side member 10 is lifted upward at the rear. When the lift of the rear side member 10 exceeds a certain point, the rear side member 10 is bent to form a concave around a joint with the center cross member 16 (hereinafter referred to as "point B") as shown in FIG. 9C (hereinafter referred to as "concave bend"). During this process, a joint with the intermediate cross member 22 is also displaced upwards.

As is obvious from FIG. 8, the bend of the intermediate cross member 22 may occur when receiving not only a laterally inward force but also an upward force. In this way, as the rear collision progresses and the rear end of the rear side member 10 is lifted, the bend of the intermediate cross member 22 more certainly occurs.

Figure 10:
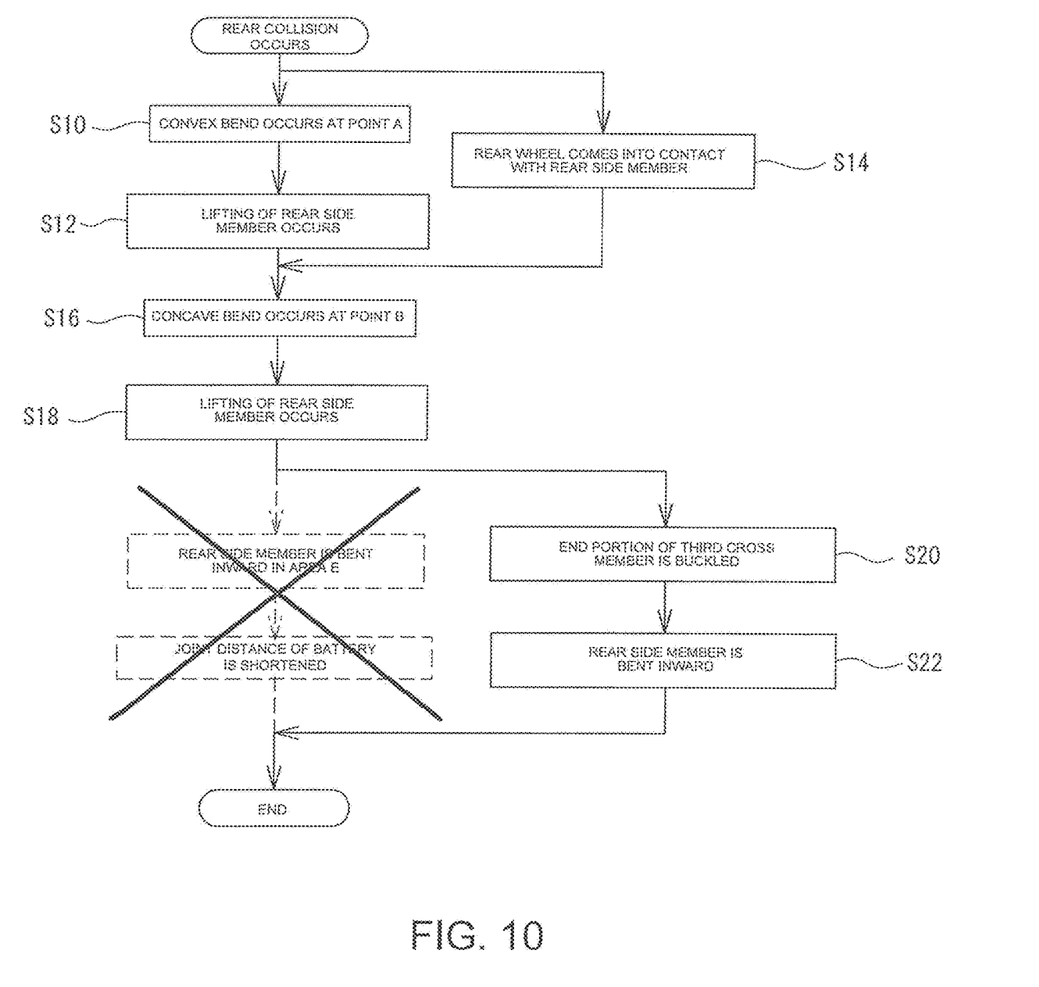
FIG. 10 is a flowchart showing a deformation process of the vehicle rear frame in the event of a rear collision.

FIG. 10 is a flowchart showing a flow of deformation of the rear frame in the event of a rear collision. When a rear collision occurs, the rear side member 10 is bent to form a convex around the point A, that is, around the second rear cross member 20 and also around the rear joint of the suspension member 32 such that the rear side member 10 is lifted to form a substantially upward protrusion around the point A (S10). Then, the rear side member 10 is compressed at a portion rear to the point A by collision loads. As a result, the rear side member 10 is tilted so as to be lifted at the rear.

When collision loads are further applied from the rear with the rear side members 10 in such a state, the tilt of the rear side members 10 becomes larger and causes the rear portion 30 and the curve portion 28 of the rear side member 10 to also be lifted upwards (S12). On this occasion, loads that are laterally-inwardly displaced due to the displacement of the central axis Lc are applied to the curve portion 28 of the rear side member 10. Without the intermediate cross member 22, the inward bow of the rear side member 10 would occur such that the rear side member 10 bows laterally inwards of the vehicle. In the present embodiment, because the intermediate cross member 22 is provided as described above, such an inward bow is effectively prevented, avoiding deformation of the rear side member 10 in an early stage of the collision.

At the same time as the rear side member 10 is lifted at the rear, the rear wheel 24 disposed on a side of the rear side member 10 is moved forward to come into contact with the rear side member 10 (S14). When the lift of the rear portion 30 of the rear side member 10 exceeds a certain point, the rear side member 10 is bent to form a concave around the point B, that is around the center cross member 16 (S16). This concave bend causes the rear side member 10 to be tilted at a steeper angle and further lifted upwards (S18).

At this time, the curve portion 28 of the rear side member 10 receives strong forces that are directed laterally inwards of the vehicle and upwards. If the intermediate cross member 22 were not bent, the rear side member 10 would be bent laterally inward in the area E (the area between the center cross member 16 and the intermediate cross member 22) that is not reinforced with the cross members 16, 22, shortening the joint distance of the main battery 34. As described above, because the bend point Pc is located around each end of the intermediate cross member 22, the end portion of the intermediate cross member 22 is buckled and bent prior to the inward bend of the rear side members 10 (S20). In this way, the inward bow of the rear side member 10 occurs, preventing the inward bend (S22). As a result, because a sufficient joint distance of the main battery 34 is ensured, the main battery 34 can be adequately protected.

As is obvious from above description, the present embodiment provides the intermediate cross member 22 connecting the curve portions 28 of the rear side members 10 in addition to the center cross member 16 connecting the front portions 26 of the rear side members 10 and the first rear cross member 18 connecting the rear portions 30 of the rear side members 10. In this way, the internal bow of the rear side members 10 can be effectively prevented in an early stage of a rear collision. In a middle stage or later of the rear collision, because of the bend point Pc that can impel the intermediate cross member 22 to be bent, the intermediate cross member 22 is bent prior to an inward bend of the rear side member 10. In this way, the inward bow of the rear side member 10 is allowed, effectively preventing an inward bend of the rear side member 10. As a result, because the joint distance of the main battery 34 can be sufficiently maintained, the main battery 34 can be adequately protected.

The above described structures are merely examples. The structures can be changed as required as long as the structure includes at least the center cross member 16 connecting the front portions 26 of the rear side members 10, the first rear cross member 18 connecting boundary portions between the curve portions 28 and the rear portions 30, and the intermediate cross member 22 connecting the curve portions 28 of the rear side members 10. For example, the bend points Pc may be omitted. The bottom line of the intermediate cross member 22 may be disposed continuously to the bottom line of the rear side members 10, as shown in FIG. 7.

The invention claimed is:

1. A vehicle rear structure comprising:
a pair of laterally spaced apart rear side members extending along a longitudinal axis of a vehicle; and
a first cross member, a second cross member, and a third cross member, all extending between the pair of rear side members, wherein
each of the rear side members comprises a curve portion curved to be more laterally inward at a rear of the curve portion, and longitudinally-extending front and rear portions respectively disposed at a front and the rear of the curve portion,
the first cross member connects the front portions of the pair of rear side members,
the second cross member is disposed at and connects boundary portions of the pair of rear side members, each boundary portion being located between the curve portion and the rear portion of each of the pair of rear side members, and
the third cross member connects the curve portions of the pair of rear side members.

2. The vehicle rear structure according to claim 1, wherein both ends of the third cross member are bent obliquely upwards.

3. The vehicle rear structure according to claim 2, wherein the vehicle rear structure further comprises a high voltage component disposed to straddle the first cross member and the third cross member.

4. The vehicle rear structure according to claim 1, wherein a ratio between a distance between the first cross member and the third cross member and a distance between the third cross member and the second cross member is 2:3 to 3:2.

5. A vehicle rear structure comprising:
a pair of laterally spaced apart rear side members extending along a longitudinal axis of a vehicle; and
a first cross member, a second cross member, and a third cross member, all extending between the pair of rear side members, wherein
each of the rear side members comprises a curve portion curved to be more laterally inward at a rear of the curve portion, and longitudinally-extending front and rear portions respectively disposed at a front and the rear of the curve portion,
the first cross member connects the front portions of the pair of rear side members,
the second cross member is disposed at and connects boundary portions of the pair of rear side members, each boundary portion being located between the curve portion and the rear portion of each of the pair of rear side members,
the third cross member connects the curve portions of the pair of rear side members, and
a distance between the front portions of the rear side members at the first cross member is greater than a distance between the rear portions of the rear side members at the second cross member.

6. The vehicle rear structure according to claim 5, wherein both ends of the third cross member are bent obliquely upwards.

7. The vehicle rear structure according to claim 6, wherein the vehicle rear structure further comprises a high voltage component disposed to straddle the first cross member and the third cross member.

8. The vehicle rear structure according to claim 5, wherein a ratio between a distance between the first cross member and the third cross member and a distance between the third cross member and the second cross member is 2:3 to 3:2.

9. A vehicle rear structure comprising:
a pair of laterally spaced apart rear side members extending along a longitudinal axis of a vehicle; and
a first cross member, a second cross member, and a third cross member, all extending between the pair of rear side members, wherein
each of the rear side members comprises a curve portion curved to be more laterally inward at a rear, and longitudinally-extending front and rear portions respectively disposed at a front and the rear of the curve portion,
the first cross member connects the front portions of the pair of rear side members,
the second cross member is disposed at and connects boundary portions of the pair of rear side members, each boundary portion being located between the curve portion and the rear portion of each of the pair of rear side members,
the third cross member connects the curve portions of the pair of rear side members, and
a distance between the front portions of the rear side members at the first cross member is greater than a distance between the boundary portions of the rear side members where the boundary portions connect to the rear portions.

10. The vehicle rear structure according to claim 9, wherein
both ends of the third cross member are bent obliquely upwards.

11. The vehicle rear structure according to claim 10, wherein
the vehicle rear structure further comprises a high voltage component disposed to straddle the first cross member and the third cross member.

12. The vehicle rear structure according to claim 9, wherein
a ratio between a distance between the first cross member and the third cross member and a distance between the third cross member and the second cross member is 2:3 to 3:2.

* * * * *